United States Patent
Toyama et al.

(10) Patent No.: US 9,539,917 B2
(45) Date of Patent: Jan. 10, 2017

(54) VEHICLE SEAT

(71) Applicant: TOYOTA BOSHOKU KABUSHIKI KAISHA, Aichi-ken (JP)

(72) Inventors: Masatoshi Toyama, Aichi-ken (JP); Masashi Nakanishi, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 169 days.

(21) Appl. No.: 14/050,637

(22) Filed: Oct. 10, 2013

(65) Prior Publication Data

US 2014/0103692 A1    Apr. 17, 2014

(30) Foreign Application Priority Data

Oct. 15, 2012 (JP) .................................. 2012-227682

(51) Int. Cl.
 *B60N 2/20* (2006.01)
 *B60N 2/36* (2006.01)

(52) U.S. Cl.
 CPC . *B60N 2/20* (2013.01); *B60N 2/36* (2013.01); *B60N 2002/363* (2013.01); *Y10T 16/525* (2015.01)

(58) Field of Classification Search
 None
 See application file for complete search history.

(56) References Cited

U.S. PATENT DOCUMENTS

| | | | | |
|---|---|---|---|---|
| 3,011,822 A * | 12/1961 | May | ......................... | B60N 2/20 296/66 |
| 4,848,826 A * | 7/1989 | Kuwabara | ............ | B60N 2/3009 296/37.16 |
| 4,979,772 A * | 12/1990 | Carey | .................. | B60N 2/3011 296/39.1 |
| 5,322,335 A * | 6/1994 | Niemi | .................. | B60N 2/6009 296/39.1 |
| 5,658,046 A * | 8/1997 | Rus | ....................... | B60N 2/3013 16/4 |
| 6,017,074 A * | 1/2000 | Biskup | .................... | B60R 13/01 296/39.1 |
| 6,406,085 B1 * | 6/2002 | Stanesic | .................. | B60R 5/045 296/39.1 |
| 6,623,061 B2 * | 9/2003 | Tourangeau | ......... | B60N 2/3013 296/63 |

(Continued)

FOREIGN PATENT DOCUMENTS

JP    2006-321353    11/2006

*Primary Examiner* — David E Allred
(74) *Attorney, Agent, or Firm* — Greenblum & Bernstein, P.L.C.

(57) ABSTRACT

A vehicle seat: wherein a reinforcing member includes, a first section attached to a back surface of a seat back so as to face the back surface of the seat back when the seat back is in a standing state and configured to follow the seat back when the seat back is tilted from the standing state, a second section disposed so as to face a back surface of a seat cushion when the seat back is in the standing state, and a connection portion connecting the first section and the second section, and wherein the connection portion is configured to allow the first section to bend with respect to the second section in a rearward direction of the seat, and restrict the first section to bend with respect to the second section in a forward direction of the seat.

4 Claims, 5 Drawing Sheets

(56) References Cited

U.S. PATENT DOCUMENTS

| | | | | |
|---|---|---|---|---|
| 6,719,363 B2* | 4/2004 | Erlandsson | ............ | B60R 13/013 16/237 |
| 6,767,051 B2* | 7/2004 | Erlandsson | ............ | B60R 13/013 16/225 |
| 6,918,625 B2* | 7/2005 | Storto | ................... | B60N 2/3075 296/65.09 |
| 8,002,325 B2* | 8/2011 | Foussianes | ............ | B60N 2/002 296/68.1 |
| 8,505,999 B2* | 8/2013 | Whalen | ................ | B60N 2/3013 296/65.09 |
| 2003/0042749 A1* | 3/2003 | Tourangeau | ......... | B60N 2/3013 296/63 |
| 2006/0255611 A1* | 11/2006 | Smith | ....................... | B60N 2/36 296/37.16 |
| 2008/0185866 A1* | 8/2008 | Tarrant | ................. | B60N 2/6009 296/97.22 |
| 2010/0064590 A1* | 3/2010 | Jones | ................. | E05D 15/0656 49/469 |
| 2010/0327635 A1* | 12/2010 | Whalen | ................ | B60N 2/3013 297/129 |
| 2011/0101736 A1* | 5/2011 | Sogame | ............... | B62D 25/087 296/203.04 |
| 2011/0248523 A1* | 10/2011 | Aebker | .................... | B60N 2/36 296/66 |

* cited by examiner

VEHICLE SEAT

CROSS-REFERENCE TO RELATED APPLICATIONS

This application claims priority from Japanese Patent Application No. 2012-227682 filed on Oct. 15, 2012, the entire contents of which are incorporated herein by reference.

TECHNICAL FIELD

Aspects of the present invention relate to a vehicle seat including a carpet member disposed at a back surface of a seat structure member, and a reinforcing member (a plate-like member for reinforcing the carpet member).

BACKGROUND

A vehicle seat often includes a sheet-like carpet member disposed at a back surface of a seat cushion and a seat back (seat structure member), in view of performance of the seat, such as decoration and strength of the back surface of the seat.

For example, a vehicle seat disclosed in JP-A-2006-321353 includes a seat cushion, a seat back, and a carpet member (sheet shape), and is disposed near a luggage floor (a position which is one step higher than a floor surface of a vehicle compartment).

The carpet member is disposed from a lower back surface of the seat back to the luggage floor, and can be sectioned into a first carpet portion and a second carpet portion. The first carpet portion is attached to the back surface of the seat back, while the second carpet portion is attached to the luggage floor.

In the known art, a rear surface of the first carpet portion is provided with a first reinforcing member, and a rear surface of the second carpet portion is provided with a second reinforcing member. The first and second reinforcing members are plate members extended in a sheet width direction, and a gap (a portion which is not provided with any reinforcing member) is provided between the first and second reinforcing members, and is positioned at a desired position of the carpet member (see FIG. 5 in JP-A-2006-321353).

In the known art, as the seat back is tilted forward to be flush with the luggage floor, the portion extending from the lower portion of the seat back to the luggage floor is covered by the carpet member.

Further, the carpet member is bent in an arc shape to stand the seat back up against the seat cushion. At that time, the first carpet portion (the first reinforcing member) is inclined upward, and simultaneously, the second carpet portion (the second reinforcing member) is inclined downward, so that a top of the arc is formed between the first and second carpet portions (a portion that is not provided with the reinforcing member).

SUMMARY

However, since the carpet member of the related art has the portion (a fragile portion) that is not provided with the reinforcing member, the configuration can not be easily employed in view of the improvement in the performance of the seat.

The present invention has been made in view of the above-described circumstance, and an object of the present invention is to dispose a reinforcing member to a carpet member with high performance.

According to an aspect of the present invention, there is provided a vehicle seat including: a seat structure member configured by connecting a seat back to a seat cushion in a tiltable manner; a sheet-like carpet member disposed at a back surface of the seat structure member; and a plate-like reinforcing member attached to the carpet member, wherein the carpet member is configured to bend due to a rearward tilting of the seat back, wherein the reinforcing member includes, a first section attached to a back surface of the seat back so as to face the back surface of the seat back when the seat back is in a standing state and configured to follow the seat back when the seat back is tilted from the standing state, a second section disposed so as to face a back surface of the seat cushion when the seat back is in the standing state, and a connection portion connecting the first section and the second section, and wherein the connection portion is configured to allow the first section to bend with respect to the second section in a rearward direction of the seat, and restrict the first section to bend with respect to the second section in a forward direction of the seat.

BRIEF DESCRIPTION OF DRAWINGS

FIGS. 3A and 3B are horizontal cross-sectional views of a portion of a carpet member, in which FIG. 3A is a view of a first section, and FIG. 3B is a view of a second section;

DETAILED DESCRIPTION

Figure 1:
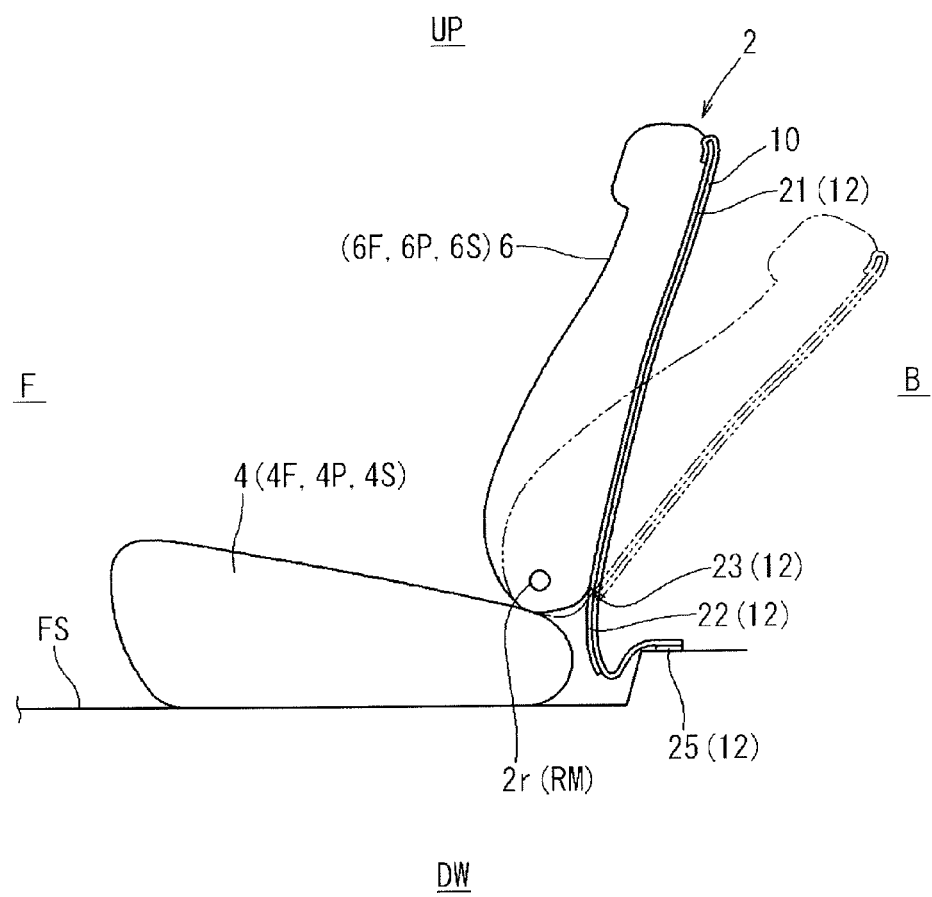
FIG. 1 is a schematic side view of a vehicle seat according to an exemplary embodiment of the present invention.
Figure 2:
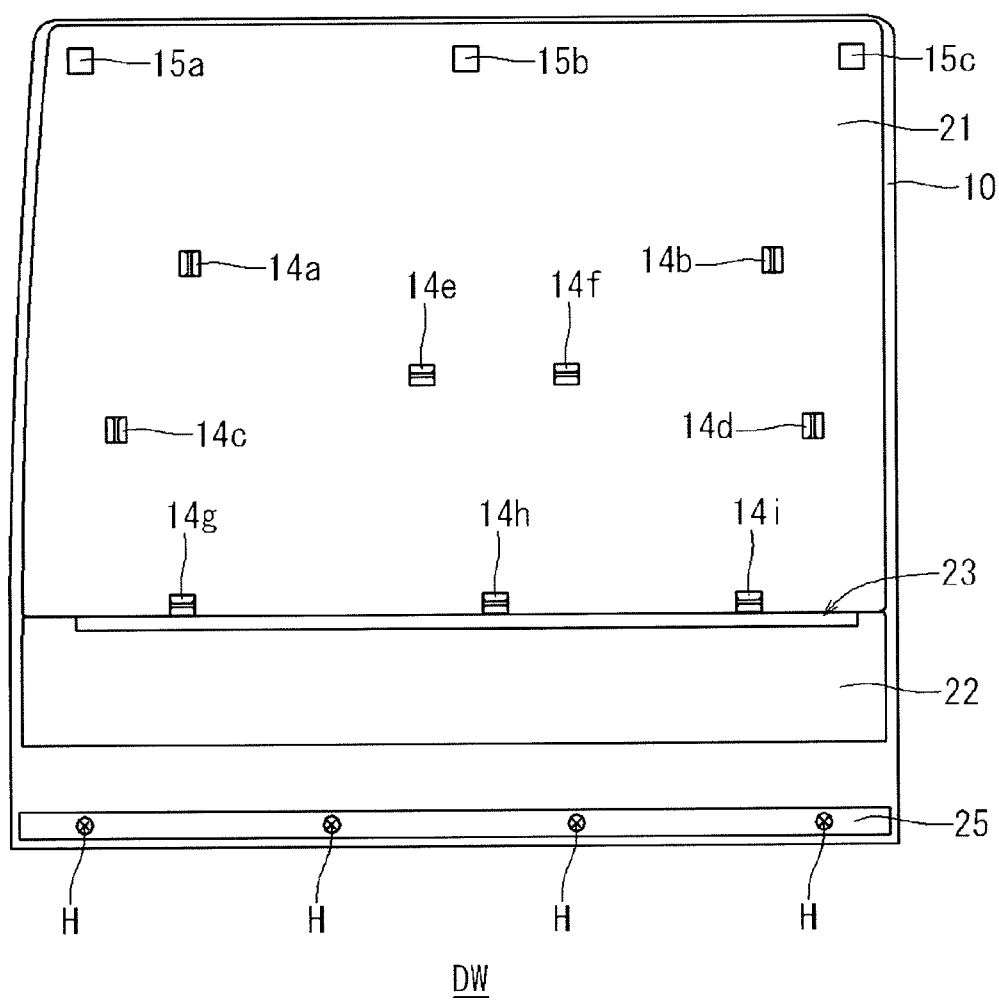
FIG. 2 is a schematic front view of a reinforcing member.
Figure 3A:
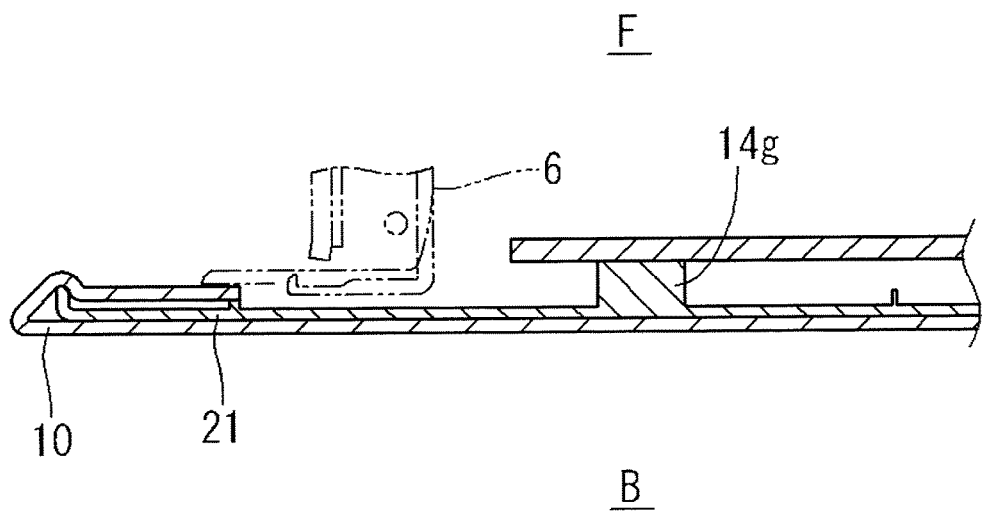
Figure 3B:
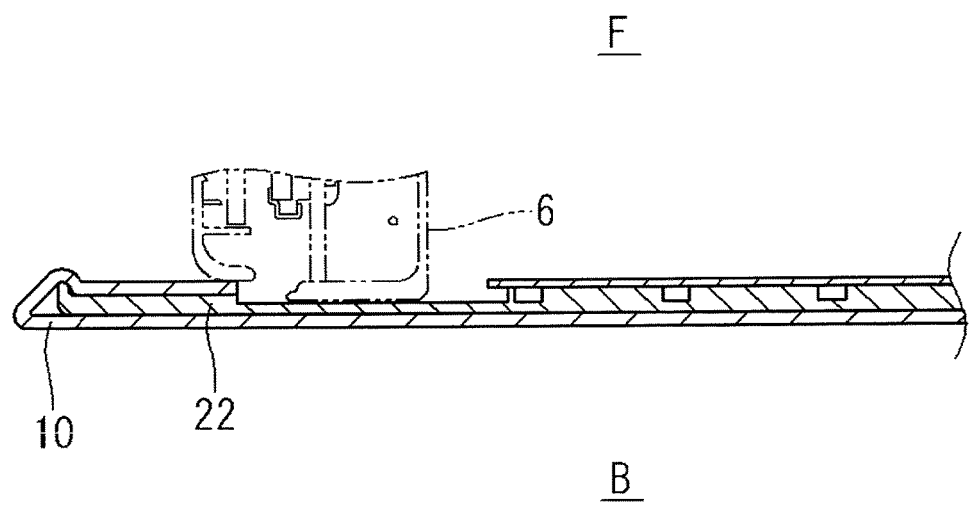

An embodiment for implementing the present invention will now be described with reference to FIGS. 1 to 5. In this instance, a front side of a vehicle seat is indicated by a reference numeral F, a rear side of the vehicle seat is indicated by a reference numeral B, an upper side of the vehicle seat is indicated by a reference numeral UP, and a lower side of the vehicle seat is indicated by a reference numeral DW.

A vehicle seat 2 in FIG. 1 includes a seat cushion 4 and a seat back 6 (seat structure member), and is provided on a floor surface FS of a vehicle compartment. The seat structure member includes frame members 4F and 6F forming a seat framework, cushion members 4P and 6P forming an appearance of the seat, and covering members 4S and 6S for covering the cushion members, respectively.

In this embodiment, the floor surface FS of the vehicle compartment is formed stepwise, and has a front floor surface (a flat surface on which the vehicle seat is provided) of the vehicle compartment and a rear floor surface of the vehicle compartment which is one step higher than the front floor surface.

In this embodiment, the seat back 6 is connected to the seat cushion 4 so that it can be tilted toward the seat cushion 4 (seat structure member is configured), and a carpet member 10, which will be described in detail later, is disposed at the back surface of the seat structure member. In view of performance of the seat (e.g., strength), a plate-like reinforcing member 12 is attached to the carpet member 10, but it is preferable that the reinforcing member 12 can be provided on the carpet member 10 with high performance.

Accordingly, in this embodiment, the reinforcing member 12 is provided on the carpet member 10 with the high performance by the configuration which will be described later. Each configuration will now be described in detail.

Seat Structure Member

Figure 4:
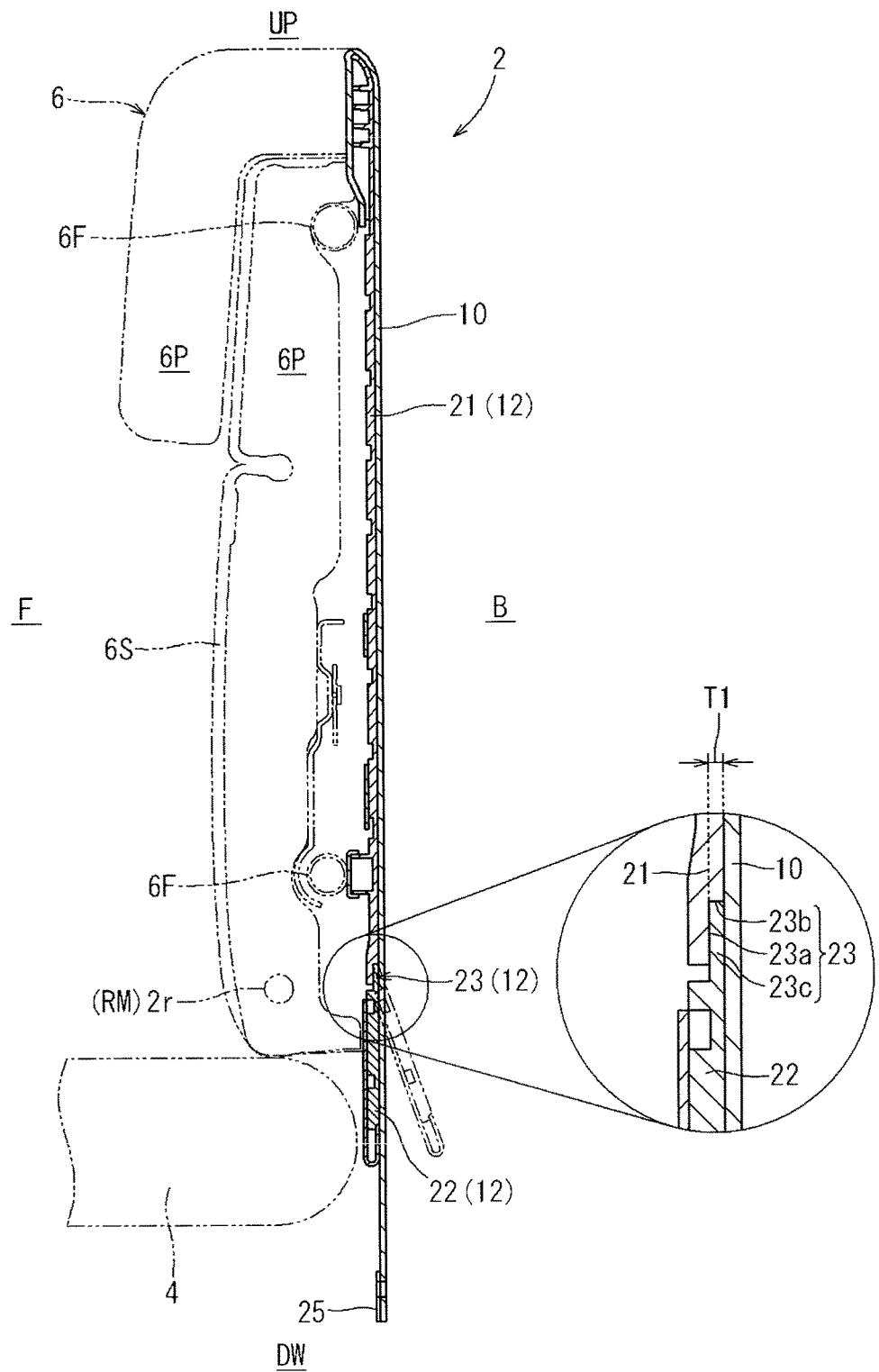
FIG. 4 is a vertical cross-sectional view of the carpet member.

The seat structure member of this embodiment includes the seat cushion 4, the seat back 6, and a reclining mechanism RM (see FIGS. 1 and 4).

The frame member 6F (arch-shaped frame) of the seat back 6 has a plurality of wires (not illustrated). The plurality of wires are wire members appropriately extending in a longitudinal direction (alternatively a horizontal direction) in the frame member 6F, and the carpet member 10 (a first section 21 which will be described later) can be attached to the wires.

The reclining mechanism RM is for maintaining a tilting state of the seat back 6 to the seat cushion 4, and has a shaft portion 2r extending in a seat width direction. In this embodiment, the seat back 6 is displaced by a rotating operation around the shaft portion 2r. The seat back 6 is displaced between a standing posture in which the seat back stands up against the seat cushion 4, a rearward tilting posture in which the seat back is tilted toward a rear side of the seat, and a forward tilting posture in which the seat back is tilted toward a front side of the seat.

Carpet Member

The carpet member 10 is a sheet-like member of a substantially rectangular shape (being slightly longer than a rear surface of the seat structure member), and has the reinforcing member 12 and an attaching plate portion 25 (see FIGS. 1 to 4).

In this embodiment, when the seat back 6 is in the standing posture, the upper portion of the carpet member 10 is disposed to face the back surface of the seat back 6, and a middle portion (a portion near the lower portion) of the carpet member 10 is disposed to face the back surface of the seat cushion 4.

The lower portion of the carpet member 10 extends toward the floor surface FS (a higher portion) of the vehicle compartment. The attaching plate portion 25 extending in the seat width direction is attached to the lower portion (rear surface) of the carpet member 10. The attaching plate portion 25 is provided with a plurality of holes H, and can be attached to the floor surface FS (the higher portion) of the vehicle compartment by bolt members or the like.

The carpet member 10 is not limited to a specific material, but the carpet member preferably has flexibility which can be bent or curved in accordance with the seat posture. The material can include, for example, textile (fabric, knit, and non-woven fabric) and leather (natural leather and artificial leather).

Reinforcing Member

The reinforcing member 12 is a plate member of a substantially rectangular shape, and has the first section 21, the second section 22, and a connecting portion 23 (which will be described later) (see FIGS. 1 to 4).

The first section 21 is a plate portion (a relatively large size) which can face the back surface of the seat back 6, while the second section 22 is a plate portion (a relatively small size) which can face the back surface of the seat cushion 4.

In this embodiment, the carpet member 10 can be attached to one side of the reinforcing member 12 (the first section 21 and the second section 22). In this instance, the other side (rear surface facing an inner side of the seat) of the reinforcing member 12 can be appropriately provided with a lattice-shaped rib (reinforcing structure and not illustrated).

The reinforcing member 12 (the first section 21 and the second section 22) is not limited to a specific material, but the material typically has higher strength than that of the carpet member 10. The material can include, for example, a resin plate or a metal plate.

The first section 21 has a plurality of engaging portions 14a to 14i and a plurality of hooking portions (engagement portions) 15a to 15c, and is attached to the back surface of the seat back 6 to face the back surface of the seat back 6.

The plurality of engaging portions 14a to 14i are portions capable of engaging with the frame member 6F (wire; not illustrated) in a fitting state. For example, the engaging portions 14a to 14d are disposed at a desired interval on the other surface of the first section 21 so that the engaging portions face (engage with) a wire extending in the seat width direction. Further, the engaging portions 14e to 14i are disposed at a desired interval on the other surface of the first section 21 so that the engaging portions face (engage with) a wire extending in a seat vertical direction.

The plurality of hooking portions 15a to 15c are portions (substantially inversed J-shaped portions) formed at a desired interval on an upper portion of the other surface of the first section 21, and can be hooked to a wire extending in a width direction on the upper portion of the seat.

Connection Portion

The connection portion 23 is a portion for connecting the first section 21 and the second section 22, and is formed by a lower end portion of the first section 21 and an upper end portion 23c of the second section 22, based on when the seat back 6 is in the standing posture (see FIG. 4).

In this embodiment, the connection portion 23 has an installation portion 23a and a bent portion 23b which are formed by bending the lower end portion of the first section 21 in a crank shape. The installation portion 23a is a portion which is installed at the inner side of the seat than one surface of the first section 21 in contact with the carpet member 10. Further, the bending portion 23b is a portion for connecting the one surface of the first section 21 and the installation portion 23a, and is disposed to cross the inner side of the seat perpendicularly.

The connection portion 23 can be formed by superimposing the upper end portion 23c (a straight shape when seen from a cross section) of the second section 22 on the installation portion 23a. In this embodiment, by appropriately adjusting a length T1 (a length in a thickness direction of the reinforcing member 12) of the bending portion 23b, one surface of the first section 21 in contact with the carpet member 10 and one surface of the second section 22 in contact with the carpet member 10 can be disposed to be flush with each other. In this instance, the term "flush" means a state where a stepped portion is hardly visible on the surface of the carpet member 10, and a stepped portion which is invisible is allowed.

Installation Work of Carpet Member

Referring to FIGS. 1 and 4, the reinforcing member 12 is attached to the carpet member 10, and then the reinforcing member 12 is installed on the back surface of the seat structure member.

In this embodiment, the upper end portion 23c of the second section 22 is superimposed on the lower end portion (installation portion 23a) of the first section 21 from the outer side of the seat to form the connection portion 23. Then, the first section 21 is disposed at the upper rear surface of the carpet member 10, and a lateral end portion of the carpet member 10 is attached to the first section 21 in a folded-over shape (see FIG. 3). In addition, the second section 22 is disposed at a middle rear surface of the carpet member 10, and a lateral end portion of the carpet member 10 is attached to the second section 22 as a folded-over shape. In this instance, a method of attaching the first section 21 (the second section 22) and the carpet member 10 includes, for example, sewing, adhesion, fusion, or a physical attaching method such as bolt fastening or clip fastening.

In this embodiment, the connection portion 23 can be formed by superimposing the first section 21 and the second section 22 (configuration having high strength). In addition, since one surface of the first section 21 and one surface of the second section 22 are disposed to be flush with each other, the carpet member 10 is configured so that a stepped portion is prevented from being formed as much as possible (configuration having high decoration).

Next, the first section 21 (the plurality of engaging portions 14a to 14i and the plurality of hooking portions 15a to 15c) is engaged with or hooked to the frame member 6F (wire). As the first section 21 is attached to the frame member 6F (wire) in this way, the first section 21 follows the lateral tilting operation of the seat back 6. In addition, the second section 22 is in a state which is not attached to the frame member 6F (in a free state). The lower portion of the carpet member 10 is attached to the floor surface FS of the vehicle compartment, with the attaching plate portion 25 being interposed therebetween.

Tilting Operation of Seat Back

Referring to FIG. 1, the seat back 6 is displaced from the standing posture to the rearward tilting posture to bend the carpet member 10 toward the rearward direction of the seat.

In this embodiment, the first section 21 is smoothly bent around the connection portion 23 with respect to the second section 22 (see FIG. 4). As the first section 21 follows the rearward tilting operation of the seat back 6, the relative position between both members is maintained. For this reason, the carpet member 10 can be bent without causing the installation portion 23a (an inner portion of the seat) to come into contact with other members inside the seat.

In addition, as the seat back 6 is displaced to the forward tilting posture, the first section 21 is tilted forward with the forward tilting operation of the seat back 6. In this instance, in this embodiment, the second section 22 (the upper end portion 23c) is tilted forward along with the first section 21, while being supported by the installation portion 23a. For this reason, in this embodiment, the entire carpet member 10 (the reinforcing member 12) can be smoothly tilted forward in accordance with the forward tilting operation of the seat back 6.

As described above, according to this embodiment, when the seat back 6 is tilted rearward, since the first section 21 and the second section 22 are relatively bent around the connection portion 23, the carpet member 10 can be provided to the seat structure member with high strength.

In addition, since the first section 21 and the second section 22 are disposed to be flush with each other in this embodiment, the carpet member 10 can be installed while preventing the stepped portion to be formed as much as possible (the configuration having the high decoration).

In this embodiment, the lower end portion 23a of the first section 21 and the upper end portion 23c of the second section 22 are superimposed to form the connection portion 23 (the configuration having the high strength). In addition, the carpet member 10 can be bent without causing the installation portion 23a (the inner portion of the seat) to come into contact with other members at the inner side of the seat. For this reason, it is possible to suppress generation of noise, which is caused by the contact between the reinforcing member 12 and other members, as much as possible, when the seat back 6 is tilted rearward.

For this reason, according to the embodiment, the reinforcing member 12 can be installed to the carpet member 10 with the high performance.

Modified Embodiment

The configuration of the connection portion can employ various configurations, as well as the above-described configuration.

Figure 5A:
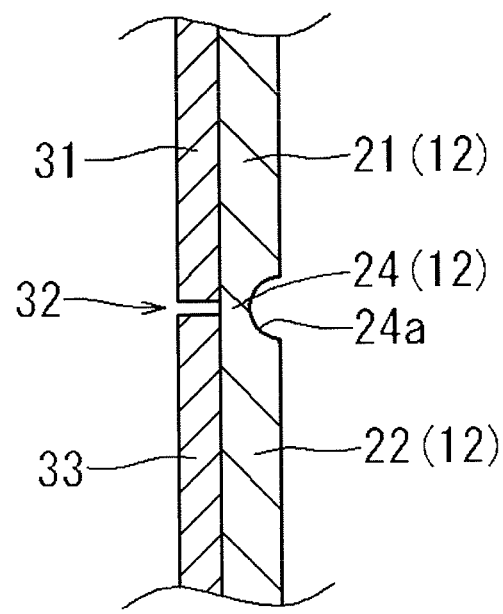
FIGS. 5A and 5B are cross-sectional views of a portion of a reinforcing member according to a modified embodiment.
Figure 5B:
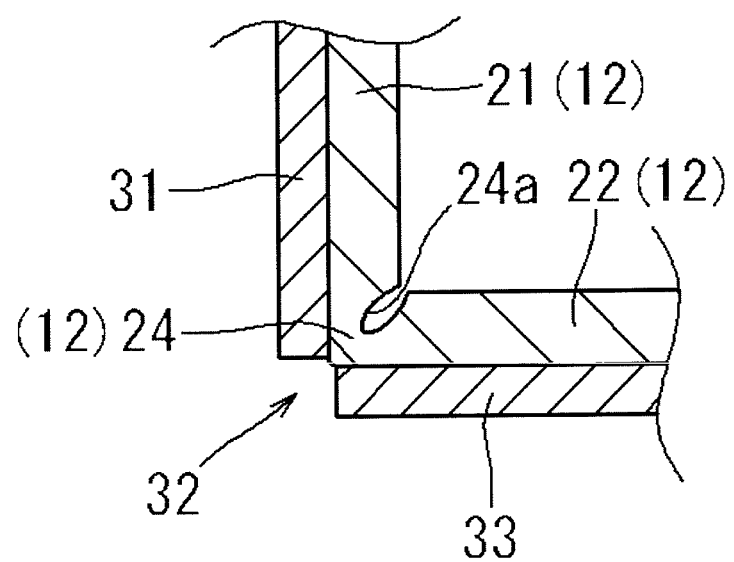

For example, in the modified example, the reinforcing member 12 is made of one piece of a plate-like member (see FIG. 5). In addition, the rear surface of the first section 21 is provided with a first rib 31, and the rear surface of the second section 22 is provided with a second rib 33. Each of the ribs 31 and 33 is a protrusion (a line shape) formed on the other surfaces of the corresponding sections 21 and 22, and may be provided in plural or single in a vertical direction based on the seat back 6 in the standing state.

In the modification, the connection portion 24 is provided with a concave portion 24a of a groove shape extending in the seat width direction, and a cut portion 32 of the first and second ribs 31 and 33 is disposed near the concave portion 24a. In this instance, the concave portion 24a is formed on the one surface (surface contacting with the carpet member 10) of the connection portion 24.

When the seat back 6 is tilted rearward, the first rib 31 and the second rib 33 are spaced apart from each other (the cut portion 32 is widely opened), and the concave portion 24a is narrowed, so that the first section 21 and the second section 22 are smoothly bent.

In addition, as the seat back 6 is displaced to the forward tilting posture, the first section 21 is inclined forward with the forward tilting operation of the seat back 6. In the modification, the first rib 31 abuts against the second rib 33 (the cut portion 32 is closed). Accordingly, the bending of the first section 21 to the second section 22 in the forward direction of the seat is restricted, so that the second section 22 is inclined forward along the first section 21.

For this reason, also in the modified embodiment, the reinforcing member 12 can be installed to the carpet member 10 with high performance. Further, in the modified embodiment, the configuration of the connection portion 24 can be relatively simplified.

The vehicle seat is not limited to the above-described embodiment, and can employ various embodiments. (1) Although the configuration of the connection portion 23 is illustrated in the embodiment, it is not intended to limit the configuration of the portion. For example, the embodiment illustrates the configuration in which the connection portion 23 has the installation portion 23a and the bent portion 23b at the lower portion (a crank shape) of the first section 21. Alternatively, the upper end portion of the second section may be formed in a crank shape (provided with an installation portion and a bent portion), and the lower end portion of the first section may be formed in a straight shape.

The lower end portion of the first section and the upper end portion of the second section can be connected to each other in a bendable manner by a hinge member (configured to be bent only in one way). (2) Further, an example has been described in the embodiment in which the first section 21 (one surface) and the second section 22 (one surface) are disposed to be flush with each other. Alternatively, a stepped portion may be formed between the first section and the second section. (3) An example has been described in the embodiment in which the lower portion of the carpet member 10 is attached to the floor surface FS of the vehicle compartment which is one step higher. Alternatively, the lower portion of the carpet member may be in an unattached state (free state), or may be attached to the floor surface of the vehicle compartment which is one step lower.

The present invention provides illustrative, non-limiting aspects as follows:

(1) In a first aspect, there is provided a vehicle seat including: a seat structure member configured by connecting a seat back to a seat cushion in a tiltable manner; a sheet-like carpet member disposed at a back surface of the seat structure member; and a plate-like reinforcing member attached to the carpet member, wherein the carpet member is configured to bend due to a rearward tilting of the seat back, wherein the reinforcing member includes, a first section attached to a back surface of the seat back so as to face the back surface of the seat back when the seat back is in a standing state and configured to follow the seat back when the seat back is tilted from the standing state, a second section disposed so as to face a back surface of the seat cushion when the seat back is in the standing state, and a connection portion connecting the first section and the second section, and wherein the connection portion is configured to allow the first section to bend with respect to the second section in a rearward direction of the seat, and restrict the first section to bend with respect to the second section in a forward direction of the seat.

According to the first aspect, the first and second sections are connected to each other by the connection portion (that is, configured so as to prevent providing a fragile portion as much as possible), thereby providing a seat configuration having high strength.

In addition, when the seat back is tilted rearward, the first section and the second section can be relatively bent around the connection portion. As the bending of the first section to the second section in the forward direction of the seat is restricted, the second section is inclined forward together with the first section, when the seat back is inclined forward.

(2) In a second aspect, there is provided the vehicle seat according to the first aspect, wherein, when the seat back is in the standing state, one surface of the first section in contact with the carpet member is disposed to be flush with one surface of the second section in contact with the carpet member.

According to the second aspect, since the first section and the second section are disposed to be flush with each other, the carpet member is configured so that a stepped portion is prevented from being formed as much as possible (seat configuration having high decoration).

(3) In a third aspect, there is provided the vehicle seat according to the first aspect or the second aspect, wherein a lower end portion of the first section is formed in a crank shape and has an installation portion which is disposed at an inner side of the seat than the one surface of the first section, and wherein the connection portion is formed by superimposing an upper end portion of the second section on the installation portion from an outer side of the seat.

Accordingly to the third aspect, the connection portion is configured by superimposing the upper end portion of the second section on the installation portion from the outer side of the seat (configuration having high strength). Further, since the first section follows the seat back when the seat back is tilted rearward, the relative position between both members is maintained, thereby avoiding the installation portion (an inner portion of the seat) and other members at an inner side of the seat from coming into contact with each other at the most.

(4) In a fourth aspect, there is provided the vehicle seat according to the first aspect or the second aspect, wherein a material of the reinforcing member has higher strength than that a material of the carpet member.

According to the first aspect, the reinforcing member can be provided to the carpet member with high performance. Further, according to the second aspect, the reinforcing member can be provided to the carpet member with further high performance. Further, according to the third aspect, the reinforcing member can be provided to the carpet member with still further high performance.

What is claimed is:

1. A vehicle seat comprising:
   a seat structure member configured by connecting a seat back to a seat cushion in a tiltable manner;
   a carpet member disposed at a back surface of the seat structure member and configured to bend due to a rearward tilting of the seat back; and
   a reinforcing member attached to the carpet member, the reinforcing member including:
      a first section attached to a back surface of the seat back so as to face the back surface of the seat back when the seat back is in a standing state and configured to follow the seat back when the seat back is tilted from the standing state;
      a second section disposed between the carpet member and the seat back when the seat back is in the standing state so as to face a back surface of the seat cushion when the seat back is in the standing state; and
      a connection portion connecting the first section and the second section, the connection portion being configured to allow the first section to bend with respect to the second section when the seat back is tilted rearwards from the standing state, and restrict the first section from bending with respect to the second section when the seat back is tilted forwards from the standing state, wherein
   a lower end portion of the first section is depressed and has an installation portion which is disposed closer to the seat back than a surface of the first section that faces a rearward direction of the seat, and
   the connection portion is defined by an upper end of the second section superimposed on the installation portion from an outer side of the seat, the upper end of the second section being sandwiched between the installation portion and the carpet.

2. The vehicle seat according to claim 1,
   wherein, when the seat back is in the standing state, one surface of the first section in contact with the carpet member is disposed to be flush with one surface of the second section in contact with the carpet member.

3. The vehicle seat according to claim 1,
   wherein a material of the reinforcing member has a strength higher than a strength of a material of the carpet member.

4. The vehicle seat according to claim 1, wherein
   the connection portion is connected to the second section at a first end of the second section,
   the carpet member extends beyond a second end of the second section to define a terminal end of the carpet member, and
   the terminal end of the carpet member is attached to an attaching plate portion, the attaching plate portion being configured to be attached to a floor of a vehicle.

* * * * *